Oct. 31, 1933.　　　F. A. OETKEN　　　1,933,025
FURNACE FOR BURNING REFUSE
Filed May 20, 1932
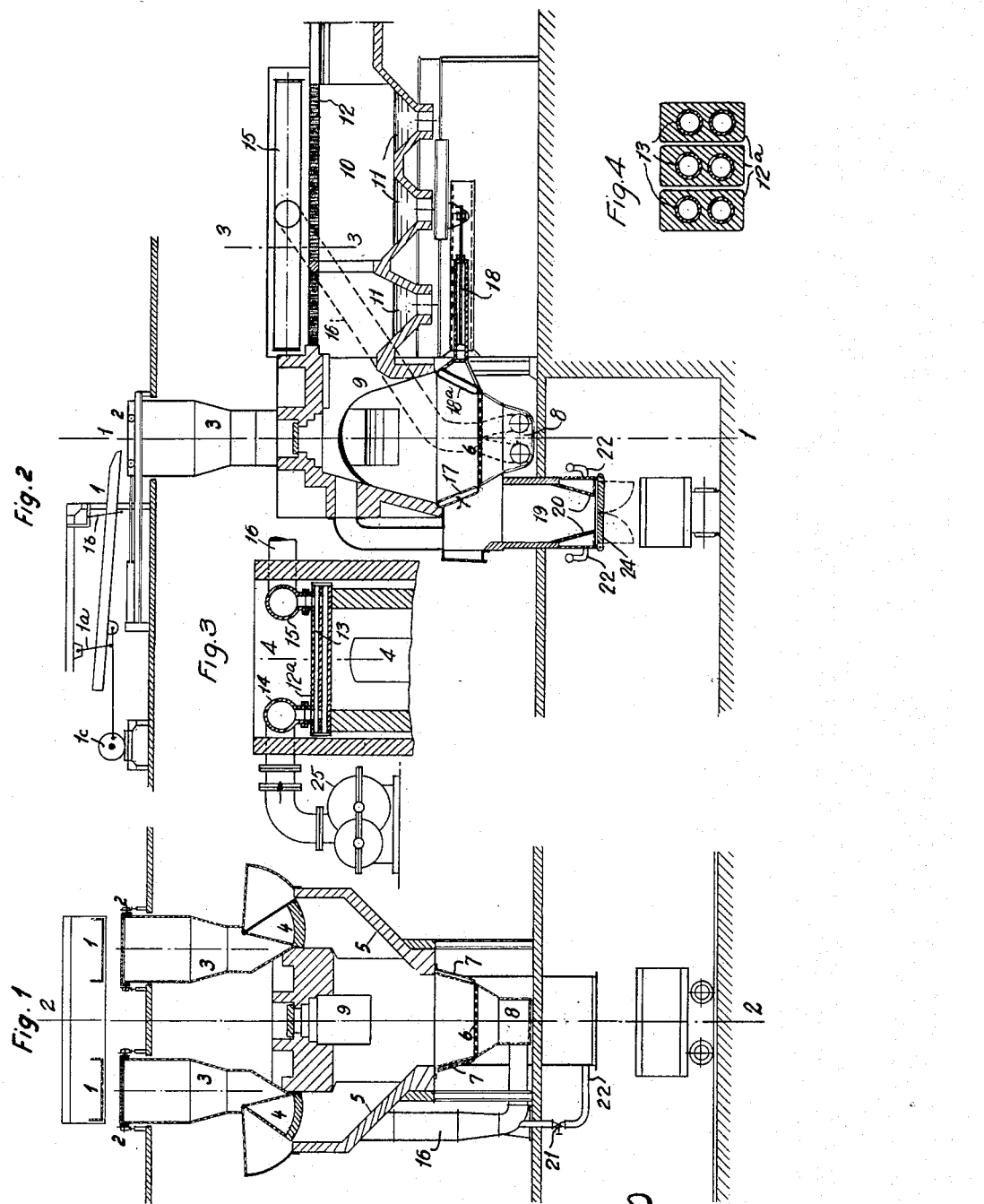
Inventor:
Friedrich August Oetken,
By Byrne, Townsend & Potter,
Attorneys.

Patented Oct. 31, 1933

1,933,025

UNITED STATES PATENT OFFICE 1,933,025

FURNACE FOR BURNING REFUSE

Friedrich August Oetken, Frankfort-on-the-Main, Germany, assignor to American Lurgi Corporation, New York, N. Y., a corporation of New York Application May 20, 1932. Serial No. 612,606

9 Claims. (Cl. 110—8)

This invention relates to various improvements in furnaces for burning refuse, the object of said improvements being to effect a particularly rapid, intensive and complete combustion of the refuse, and to enable an extremely high output to be obtained with the furnace, per unit of grate surface, and at the same time to furnish a high grade baked slag.

The furnace of the present invention is accordingly composed of a plurality of specially designed main parts. It consists of a main combustion chamber, that is to say a shaft lined with refractory blocks, the lower portion of said shaft being equipped, if desired, with water-cooled walls, and the shaft itself being closed, at the lower end, by a grate plate provided with tuyères. This main combustion shaft chamber is connected with a fly ash settling chamber, into which the gases from the main combustion process are admitted, and wherein the solid constituents present in said gases are separated and completely incinerated. In addition, an air preheater is located in or upon the fly ash settling chamber. Moreover, a secondary combustion chamber is provided for the charge residues which have not been completely burnt in the main combustion chamber, and finally, means are provided for enabling the furnace to be charged with a large quantity of refuse in a loosened condition.

The main combustion chamber is in the form of a shaft in which a layer of refuse, 3 to 5 ft. deep, is consumed. The grate through which the air of combustion is admitted to said layer, consists of a tuyère plate, that is, a cast iron plate provided with numerous small holes through which the highly heated air of combustion is blown, in powerful, fine streams, into the layer of refuse on the grate. In this way, the combustion proceeds very rapidly and intensively, and is substantially independent of any irregularities in the composition of the refuse and in its distribution on the grate. If, during combustion, the charge of refuse in the main combustion chamber sinters to form a cake of clinker, shaft walls of refractory material are very liable to corrosion. When such high combustion temperatures are employed, it is advisable to equip the lower portion of the walls of the main combustion chamber with water cooling.

In order to enable the combustion of deep layers of refuse to proceed in an approximately uniform manner, the refuse must be loosened and introduced into the furnace in a condition free from lumps due to caking and entanglement. Since, as is known, refuse has a great tendency to form lumps of this kind, the present invention provides for the refuse that is to be consumed being, in the first place, taken from a storage bunker, by means of a grab, and deposited on a shaker trough, mounted with a gentle fall and swinging horizontally without exerting any projective action. A trough of this kind is capable, not only of conveying a lump of refuse, but also of completely loosening it in transit. It has been ascertained that shaker troughs which are actuated in this manner are alone capable of producing this effect, whereas those which describe projective movements would transport a lump of refuse without loosening it.

By means of the shaker trough, the loosened refuse is fed to the "tops" of the furnace, which are of the double-seal type in order to prevent the escape of fumes. The space between the upper and lower parts of the double seal is of sufficient dimensions to accommodate half a charge or a whole charge. When the lower part of the seal is opened, the refuse does not fall directly on to the grate, because it could again cake together in so doing, but slides down over oblique surfaces, so as to remain in the loosened condition during the whole of its passage from the shaker trough to the grate.

The gases of combustion from the main combustion chamber, which carry away a large portion of the fine constituents of the refuse, are led from the main combustion chamber into the fly ash settling chamber, where the flow of said gases is checked and, if necessary, deflected by baffles so as to cause the bulk of the suspended solid constituents (flue dust) to settle down. Since, as a rule, this dust is very difficult to burn, it is highly advantageous that it should be carried by the hot gases for some time and incinerated, separately from the coarse refuse, in a special chamber. The fly ash settling chamber also serves to accommodate an air preheater. A thorough preheating of the air for combustion to temperatures up to 200—300° C. is of the greatest importance for the combustion of the refuse, and for this reason, the entire roof,—or even the roof and walls—of the ash chamber is or are designed as an air preheater consisting of iron beams forming an interconnected heating radiator and provided with internal passages for the air to be heated. The air is delivered, by a blower, to a main pipe, from which it is distributed to the several heating members and, after being again collected in a second main, is finally delivered to the grate.

The last combination member of the high-output furnace of the present invention is the secondary combustion chamber, for the complete combustion and clinkering of the residues from the main combustion chamber. It is in no wise essential that the combustion of the refuse should be carried to completion in the main combustion chamber. The operation in the latter may be interrupted, when considerable sintering and clinkering has set in, and be completed in the secondary combustion chamber with a less intensive blast. For this purpose, as soon as the clinkering and sintering of the layer of refuse on the main grate has progressed to a certain stage, the refuse is forced, by means of a hydraulic or electric pusher, from the main grate into the secondary combustion chamber, only sufficient residue for the ignition of the next charge being left on the main grate. The shortened duration of the combustion period on the main grate, naturally results in a considerable increase in the total output capacity of the furnace. The secondary combustion chamber is also provided with a tuyère grate, through which—as in the case of the main grate—strongly heated air of combustion is blown in under pressure. The waste gases from the secondary combustion chamber are carried off through a separate flue and led, for example, back into the upper part of the main combustion chamber.

The object of the present invention, namely a rapid, intensive and complete combustion of refuse, with maximum increase in output capacity and with production of a thoroughly burnt clinker, is unattainable except by the combination of the hereinbefore described apparatus.

Such outputs cannot be obtained unless the layer of refuse on the main grate has a depth of 3 to 6 ft., and such a layer cannot be satisfactorily supplied with air of combustion without employing a tuyère grate. Again, without intensively preheating the air, a deep layer of refuse cannot be burned except with great difficulty and only very slowly, if possible at all.

Unless the charging device feeds the refuse into the furnace in a completely loosened condition, lumps are formed on the grate and may lie for hours in the fire without burning right through, or even without completely drying. In the absence of a fly ash settling chamber for the separation and combustion of the flue dust, the gases of combustion from the main combustion chamber leave the destructor—under the intensive conditions of the air supply through the tuyère grate—with such impermissibly large amounts of dust that the latter could hardly be dealt with in ordinary dust separating appliances, and moreover would not be completely incinerated without the very high-temperature ash chambers.

A blast heater of the kind which is largely employed is insufficient for such an intensive operation as that of the present invention. It is only by applying the hottest gases of combustion to heating the blast that the temperatures necessary for operating a furnace according to the invention can be attained.

Finally, an output of the extent attainable in the furnace according to the invention cannot be obtained without a secondary combustion chamber, since this chamber takes over an important part of the work of the main combustion chamber and, if absent, necessitates keeping the material much longer on the main grate. Otherwise, the material would be imperfectly consumed and the clinker be less completely sintered, and therefore of inferior value. The secondary combustion chamber according to the invention is particularly adapted for completing the burning of the half-burnt clinker.

Consequently, it is only by the combination of all the apparatus specified that the purpose of the invention can be achieved.

In order more clearly to understand the invention reference is made to the accompanying drawing which illustrates diagrammatically and by way of example, one embodiment of refuse destructor according to the invention.

Fig. 1 is a vertical section through a refuse destructor embodying the invention on line 1—1 of Fig. 2;

Fig. 2 is a longitudinal section on line 2—2 of Fig. 1;

Fig. 3 is a fragmentary section on line 3—3 of Fig. 2; and

Fig. 4 is a section on line 4—4 of Fig. 3.

The refuse is delivered on to the shaker trough 1 by means of a grab (not shown) or any other conveying device. The trough is suspended at 1a, and 1b, and agitated by means of shaking device 1c in such a manner that it disentangles the refuse into a loose stream and carries it forward at the same time. The refuse drops through the closable opening 2 into the charging hopper 3. The furnace shown in the drawing is provided with two charging devices which, as can be clearly seen from the cross section in Fig. 1, are disposed on opposite sides of the main combustion chamber. Each of the charging hoppers 3 has a capacity of, for example, half a charge. When the hopper 3 has been filled, the opening 2 is closed again.

The refuse is admitted into the furnace by opening the lower flap 4, whereupon the loosely introduced refuse falls, without caking together again, on to the oblique surfaces 5—which are clearly shown in Fig. 1—slides down these into the furnace chamber and finally falls onto the tuyère grate 6 surrounded by water jackets 7.

The grate consists of a cast-iron plate, which is provided with a number of small openings and comparatively small free grate area. Below the grate is the blast chamber 8, which is supplied with highly heated air for combustion by conduit 16 under such a high pressure that the air penetrates uniformly in powerful small streams, through the openings in the grate and into the layer of refuse, which is about 4 ft. deep. The charge of refuse newly introduced into the furnace is ignited by the residues of the previous charge, which are left on the grate for that purpose, and burns intensively at a high temperature by reason of the powerful concentration of heat consequent upon the manner in which the furnace is constructed.

The gases of combustion are led through the opening 9 to the fly ash settling chamber 10, carrying with them a large portion of the fine constituents of the refuse. These fine constituents are deposited in the settling chamber, in which the velocity of the gases decreases. They settle down on the bottom of the chamber and are drawn off through the openings 11.

The roof—and also the walls, if desired,—of the fly ash settling chamber is designed as an air preheater 12, composed of cast-iron beams 12a with internally-cast steel tubes 13. The air of combustion is supplied, by a blower 25, to an air main 14, from which it is distributed to the various members of the air preheater. After passing through said members the air collects in a corresponding second main 15 and is then led through the pipe 16 to the blast chamber 8. The air preheater is intensively heated by the hottest gases of combustion and by the radiant heat from the glowing fine particles. If necessary, a steam boiler, or/and a second air preheater, may be connected in rear of the ash chamber.

When the combustion of the charge of refuse on the grate 6 of the main combustion chamber has progressed to a certain extent, the water-cooled hinged doors 17 are opened, and the clinker pusher 18, the water-cooled ram head 18a of which forms, in the neutral position, the rear wall of the furnace hearth, forces the contents of the furnace—except for a small residual amount—into the secondary combustion chamber 19. The walls of this chamber taper downwards and are designed as a tuyère grate 20. A portion—regulated by the throttle 21—of the highly heated air for combustion is supplied to this grate through the pipe 22, and in this manner the still imperfectly consumed residues from the main combustion are subjected to an intensive secondary combustion which leads to the formation of an excellent clinker. The waste gases from the secondary combustion pass through a special pipe 23 into the upper part of the main combustion chamber. Shortly before the main combustion chamber is emptied and recharged, the flaps 24 are opened, so that the contents of the secondary combustion chamber fall into the clinker trucks and make room in the secondary combustion chamber for a further quantity of combustion residues from the main combustion chamber.

I claim:—

1. A refuse destructor comprising a main combustion chamber having a tuyère grate at the bottom thereof, means for feeding refuse into the main combustion chamber in a loose stream, a fly ash settling chamber directly connected with the main combustion chamber, air-heating means associated in heat transfer relation with said fly ash settling chamber, means for conducting hot air from said air-heating means to the tuyère grate of the main combustion chamber, a secondary combustion chamber adjacent the main combustion chamber, and means for transferring material from the grate of the main combustion chamber into the secondary combustion chamber.

2. A refuse destructor comprising a main combustion chamber having a tuyère grate at the bottom thereof and a double seal charging opening at the top, means for feeding refuse into the main combustion chamber in a loose stream, a fly ash settling chamber directly connected with the main combustion chamber, air-heating means associated in heat transfer relation with said fly ash settling chamber, means for conducting hot air from said air-heating means to the tuyère grate of the main combustion chamber, a secondary combustion chamber adjacent the main combustion chamber, and means for transferring material from the grate of the main combustion chamber into the secondary combustion chamber.

3. A refuse destructor comprising a main combustion chamber having a tuyère grate at the bottom thereof and a double seal charging opening at the top, a shaker trough for feeding refuse into the main combustion chamber in a loose stream, a fly ash settling chamber directly connected with the main combustion chamber, air-heating means associated in heat transfer relation with said fly ash settling chamber, means for conducting hot air from said air-heating means to the tuyère grate of the main combustion chamber, a secondary combustion chamber adjacent the main combustion chamber, and means for transferring material from the grate of the main combustion chamber into the secondary combustion chamber.

4. A refuse destructor comprising a main combustion chamber having a tuyère grate surrounded by water-cooled walls at the bottom thereof and a double seal charging opening at the top, a shaker trough for feeding refuse into the main combustion chamber in a loose stream, a fly ash settling chamber directly connected with the main combustion chamber, air-heating means associated in heat transfer relation with said fly ash settling chamber, means for conducting hot air from said air-heating means to the tuyère grate of the main combustion chamber, a secondary combustion chamber adjacent the main combustion chamber, and means for transferring material from the grate of the main combustion chamber into the secondary combustion chamber.

5. A refuse destructor comprising a main combustion chamber having a tuyère grate surrounded by water-cooled walls at the bottom thereof and a double seal charging opening at the top, a shaker trough for feeding refuse into the main combustion chamber in a loose stream, a fly ash settling chamber directly connected with the main combustion chamber, air-heating means forming the roof of said fly ash settling chamber, means for conducting hot air from said air-heating means to the tuyère grate of the main combustion chamber, a secondary combustion chamber adjacent the main combustion chamber, and means for transferring material from the grate of the main combustion chamber into the secondary combustion chamber.

6. A refuse destructor comprising a main combustion chamber having a tuyère grate surrounded by water-cooled walls at the bottom thereof and a double seal charging opening at the top, a shaker trough for feeding refuse into the main combustion chamber in a loose stream, a fly ash settling chamber directly connected with the main combustion chamber, air-heating means comprising heat conductive members having internal passages for the flow of air and forming the roof of said fly ash settling chamber, means for conducting hot air from said air-heating means to the tuyère grate of the main combustion chamber, a secondary combustion chamber adjacent the main combustion chamber, and means for transferring material from the grate of the main combustion chamber into the secondary combustion chamber.

7. A refuse destructor comprising a main combustion chamber having a tuyère grate surrounded by water-cooled walls at the bottom thereof and a double seal charging opening at the top, a shaker trough for feeding refuse into the main combustion chamber in a loose stream, a fly ash settling chamber directly connected with the main combustion chamber, air-heating means comprising heat conductive members having internal passages for the flow of air and forming the roof of said fly ash settling chamber, means for conducting hot air from said air-heating means to the tuyère grate of the main combustion chamber, a secondary combustion chamber adjacent the main combustion chamber, slanting tuyère grates in the lower portion of the walls of the secondary combustion chamber, means for conducting hot air from said air-heating means to the tuyère grates of the secondary combustion chamber, and means for transferring material from the grate of the main combustion chamber into the secondary combustion chamber.

8. A refuse destructor comprising a main combustion chamber having a tuyère grate surrounded by water-cooled walls at the bottom thereof and a double seal charging opening at the top, a shaker trough for feeding refuse into the main combustion chamber in a loose stream, a fly ash settling chamber directly connected with the main combustion chamber, air-heating means comprising heat conductive members having internal passages for the flow of air and forming the roof of said fly ash settling chamber, means for conducting hot air from said air-heating means to the tuyère grate of the main combustion chamber, a secondary combustion chamber adjacent the main combustion chamber, slanting tuyère grates in the lower portion of the walls of the secondary combustion chamber, means for conducting hot air from said air-heating means to the tuyère grates of the secondary combustion chamber, means for transferring material from the grate of the main combustion chamber into the secondary combustion chamber, and means for conveying combustion gases from the secondary combustion chamber to the upper portion of the main combustion chamber.

9. A refuse destructor comprising a main combustion chamber having a tuyère grate at the bottom thereof and a double seal charging opening at the top, a shaker trough for feeding refuse into the main combustion chamber in a loose stream, a fly ash settling chamber directly connected with the main combustion chamber, air-heating means associated in heat transfer relation with said fly ash settling chamber, means for conducting hot air from said air-heating means to the tuyère grate of the main combustion chamber, a secondary combustion chamber adjacent the main combustion chamber, and means comprising a ram, the head of which forms one wall of the hearth of the main combustion chamber, for transferring material from the grate of the main combustion chamber into the secondary combustion chamber.

FRIEDRICH AUGUST OETKEN.